A. W. DEMUTH.
GLASS BUTTON.

No. 42,931. Patented May 31, 1864.

Witnesses:
A. F. Schlegel
M. M. Livingston

Inventor:
A. Wm Demuth

UNITED STATES PATENT OFFICE.

A. WILLIAM DEMUTH, OF NEW YORK, N. Y.

GLASS BUTTON.

Specification forming part of Letters Patent No. 42,931, dated May 31, 1864.

*To all whom it may concern:*

Be it known that I, A. WILLIAM DEMUTH, of 212 William street, in the city, county, and State of New York, have invented a new process of making Glass Buttons; and I do hereby declare that the following is a full, clear, and exact description of the same, reference being had to the accompanying drawings, forming part of this specification, in which—

Figure 4:
Figure 3:
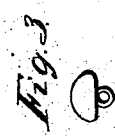
Figure 1:
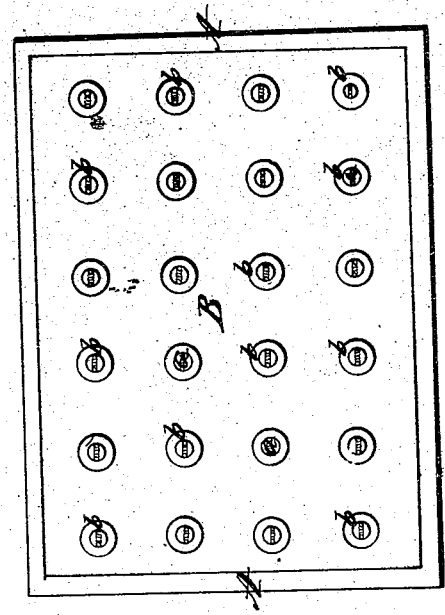
Figure 2:
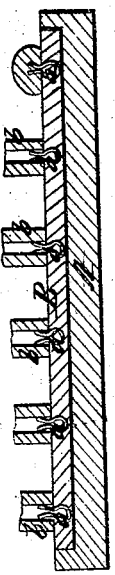

Figure 1 is a plan of an iron plate as used in this process. Fig 2 is a vertical section of the same, corresponding to Fig. 1. Figs. 3 and 4 are side views of the finished buttons.

Similar letters of reference indicate corresponding parts in all the figures.

The object of my invention is to make cheaper and better-finished glass buttons; and to this end it consists in placing pieces of glass pipe on the shanks, the latter being partially embedded in clay or other suitable substance, which is spread on an iron plate. The plate thus mounted is then introduced into an oven, where the glass is melted and thus forms a perfect button.

To enable others skilled in the art to manufacture buttons according to my invention, I will proceed to describe the process with reference to the drawings.

A is an iron plate, so constructed that a body of clay can be spread on its face, it having a projecting border all around. B is the clay or other suitable substance, into which the shanks are partially embedded; as seen in Fig. 2. *a* are the shanks, and *b* are the pieces of glass pipe, which are placed on the shanks so that the latter enter the cavity in the pieces of glass pipe.

Having distributed as many shanks as the size of the plate A will allow into the bed of clay B, I place a piece of glass pipe, *b*, over each of the said shanks *a*, as seen in Figs. 1 and 2, and I then expose the plate thus mounted to a melting heat in an oven constructed for that purpose. While thus exposed to the heat the pieces of glass pipe *b* will melt around that part of the shanks *a* which are protruding out of the clay B, and thus form a perfect button, the shape of which depends on the size of the pieces of glass pipe. I do not confine myself to any particular shape, for while they are in a hot state they may be made in any shape with proper dies.

Heretofore glass buttons had to be made at the "blow-pipe," which is a very tedious and slow process, and requires skillful workmen, while with my new process it takes but little time and labor to manufacture large quantities of buttons in a short time.

Glass buttons have become a much desired article of trade, and being manufactured mostly in Europe, I am thus enabled to furnish them cheaper than before. Another advantage over the old mode of making glass buttons is the ease with which I can make buttons with variously-colored stripes, since I am enabled to use glass pipe manufactured so as to produce any variety of colored stripes.

What I claim as my invention, and desire to secure by Letters Patent, is—

The process of making glass buttons or other articles of glass, as herein described, and for the purpose specified.

A. WM. DEMUTH.

Witnesses:
A. F. SCHLEGELN,
M. M. LIVINGSTON.